(12) United States Patent
Holm

(10) Patent No.: US 7,590,035 B1
(45) Date of Patent: Sep. 15, 2009

(54) SYSTEM AND METHOD FOR GENERATING AND USING TABLE OF CONTENT (TOC) PRINTS

(75) Inventor: Frode Holm, Santa Barbara, CA (US)

(73) Assignee: Resonance Media Services, Inc., San Francisco, CA (US)

( * ) Notice: Subject to any disclaimer, the term of this patent is extended or adjusted under 35 U.S.C. 154(b) by 567 days.

(21) Appl. No.: 11/512,625

(22) Filed: Aug. 29, 2006

(51) Int. Cl.
*G11B 5/09* (2006.01)

(52) U.S. Cl. .................. 369/47.1; 369/59.1; 707/9

(58) Field of Classification Search .......... None
See application file for complete search history.

(56) References Cited

U.S. PATENT DOCUMENTS

| | | |
|---|---|---|
| 4,996,642 A | 2/1991 | Hey |
| 5,124,911 A | 6/1992 | Sack |
| 5,412,564 A | 5/1995 | Ecer |
| 5,790,426 A | 8/1998 | Robinson |
| 5,859,414 A | 1/1999 | Grimes et al. |
| 5,872,850 A | 2/1999 | Klein et al. |
| 5,954,640 A | 9/1999 | Szabo |
| 5,969,283 A | 10/1999 | Looney et al. |
| 6,061,680 A | 5/2000 | Scherf et al. |
| 6,232,539 B1 | 5/2001 | Looney et al. |
| 6,236,978 B1 | 5/2001 | Tuzhilin |
| 6,358,546 B1 | 3/2002 | Bebiak et al. |
| 6,385,744 B1 * | 5/2002 | Ando et al. ............. 369/275.3 |
| 6,953,886 B1 | 10/2005 | Looney et al. |
| 7,013,301 B2 | 3/2006 | Holm et al. |
| 7,205,471 B2 | 4/2007 | Looney et al. |
| 2005/0078577 A1 * | 4/2005 | Horie ..................... 369/47.28 |

* cited by examiner

Primary Examiner—Muhammad N. Edun
(74) Attorney, Agent, or Firm—Christie, Parker & Hale, LLP.

(57) ABSTRACT

Table of contents (TOC) information contained in an audio CD is used to generate a TOC print which may be used for identifying the CD. The TOC print is generated based on the lengths of the tracks contained in the CD. A track vector is generated based on each track length and a matrix is created using the generated track vectors. A singular value decomposition (SVD) computation is performed on the matrix for decomposing the matrix into a set of linearly independent basis vectors. One or more of the basis vectors are selected and set as the TOC print for the CD. Once the TOC print has been generated, the TOC print may be compared against the TOC prints of known CDs in a central database to retrieve from the database metadata information stored in association with the known CDs.

20 Claims, 3 Drawing Sheets

SYSTEM AND METHOD FOR GENERATING AND USING TABLE OF CONTENT (TOC) PRINTS

CROSS-REFERENCE TO RELATED APPLICATIONS

This application is related to U.S. patent application Ser. No. 10/668,926, which is a continuation of U.S. Pat. No. 7,013,301, the content of which is incorporated herein by reference.

FIELD OF THE INVENTION

This invention relates generally to generating identification data, and more specifically, to generating identification data for an audio CD using information stored in its table of contents.

BACKGROUND OF THE INVENTION

Every compact disc (CD) stores a table of contents (TOC) that includes the start position of the individual tracks on the CD. When a CD is inserted into an audio CD player, the player automatically reads the TOC data, and from that, is able to display where the individual tracks start and how long the CD is.

It would be desirable, however, to have other information about the CD automatically displayed on a display in addition to the track length information. For example, it would be desirable to display the artist name, album name, track titles, and the like.

Prior art exists which generates identifiers for audio CDs based on approximate track length information calculated from the TOC data. The identifiers are stored in a central database along with information about the CD, such as, for example, the artist name and album title. However, different pressings of the same release can generate slightly different details about the starting positions of the tracks stored in the TOC. The prior art can deal with these slight differences by calculating the length of each track and reducing the timing accuracy of each calculated length by truncating the length information. The truncated length data of the various tracks is then used as the CD identifier for the CD.

The prior art determines whether a particular CD matches a CD in the central database by comparing the CD identifiers generated using the truncated lengths. A drawback with this prior art mechanism, however, is that the truncating of the length information results in data loss that may lead to erroneous results. For example, if two tracks of the same song respectively have a length of 19999 in one CD pressing and a length of 20001 in a second CD pressing, but the length accuracy is reduced by eliminating the last 4 digits of the length data, the resultant lengths are 10000 and 20000 respectively. A comparison of these two truncated lengths may exceed a set threshold and contribute to an erroneous conclusion that the CDs containing the respective tracks are different.

In another example, a particular CD may have a track length sequence of (15, 5, 15) which is to be matched against a database having a first CD with a track length sequence of (20, 10, 20) and a second CD with a track length sequence of (10, 10, 10). The prior art computes the difference of the particular CD against the CDs in the database by computing the sum of the absolute difference for each track length. Thus, according to the prior art formula, it is impossible to distinguish between the first and second CDs because they result in the same difference computation. However, when considering the "shape" of the sequences, the first CD has a similar shape sequence as the particular CD in question. The prior art mechanism does nothing to preserve information about the "shape" of a sequence.

Thus, the problem of the prior art may be summarized as follows. Two number sequences are to be compared and given a measure of similarity for the purpose of determining whether they come from the same or different "sources" (e.g. same or different CDs). The differences, in the case of a common source, are assumed to be small random perturbations of the underlying "real" data. If these sequences are examined as a plotted curve, an intuitive determination may be made based on the large scale features of the shape of the curve, while ignoring the small details. This may be analogized to zooming out on a map of a coastline.

Accordingly, what is desired is a system and method for determining whether two number sequences are from the same source that does not rely on truncated track length information and that retains information about the relationship between the different values.

SUMMARY OF THE INVENTION

Figure 1:
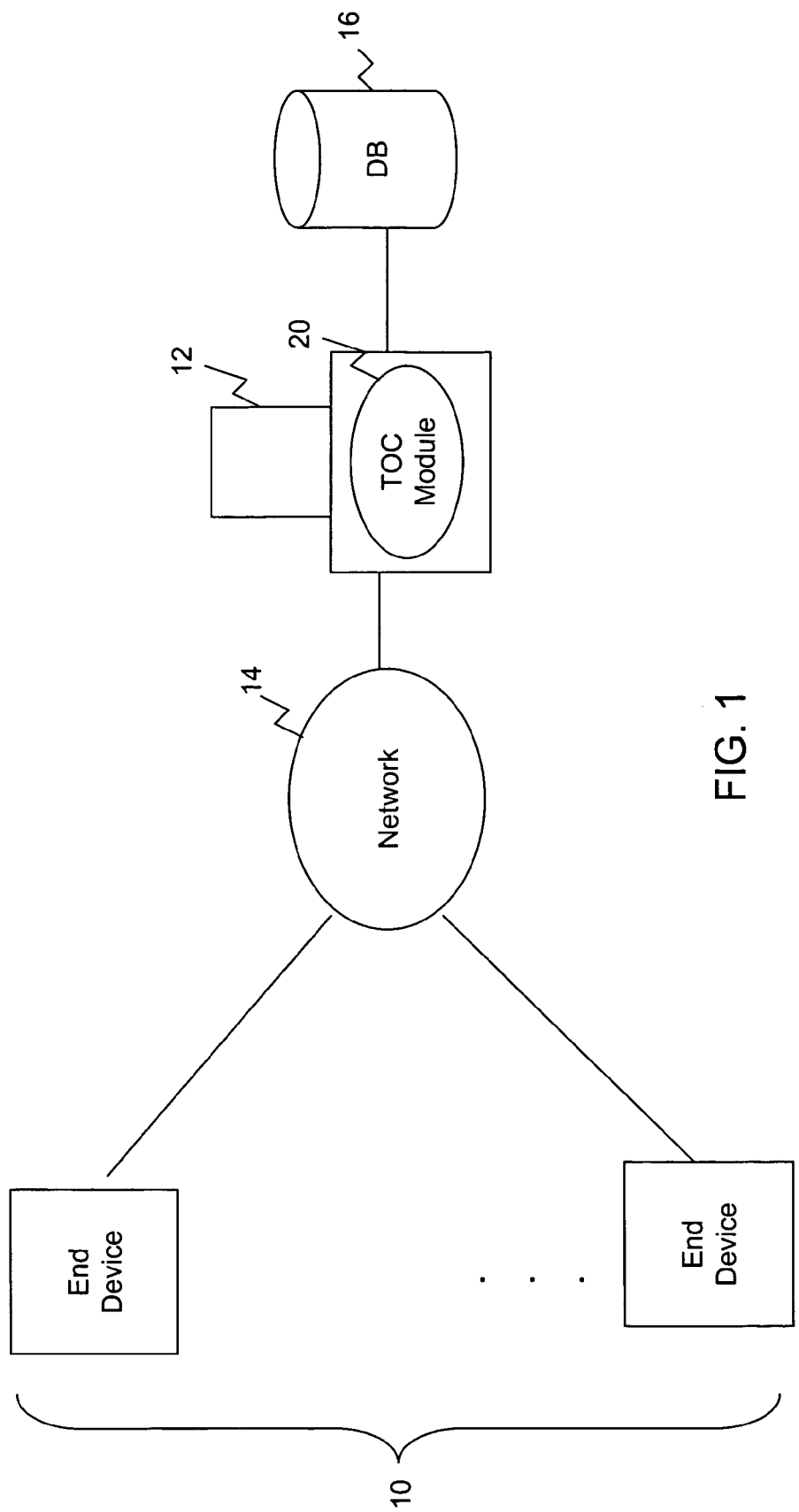
FIG. 1 is a block diagram of a system for generating and using TOC print information according to one embodiment of the invention.

Embodiments of the present invention allow two number sequences to be compared and given a measure of similarity for the purpose of determining whether they come from the same or different "sources". The similarity determination is based on the large scale features of the shape of the curve, while ignoring the small details. Such similarity determination may be achieved via the mathematical procedure of a singular value decomposition (SVD). Because the input data is a one-dimensional vector while the usage of the SVD requires a matrix, embodiments of the present invention generate a suitable matrix from the one-dimensional vector to allow usage of the SVD.

According to one embodiment, the present invention is directed to a server for identifying a first collection of recordings where each recording has a temporal position in the first collection. According to one embodiment of the invention, the first collection of recordings is an audio compact disc, and each recording is an audio track in the audio compact disc. The server retrieves a temporal length for each of M recordings in the first collection. According to one embodiment, $M \geq 3$. Each temporal length is based on the temporal position of the corresponding recording. The server generates M track vectors for the M recordings where each of the M track vectors includes N vector elements. According to one embodiment of the invention, M=N. Each of the N vector elements is a function of the temporal length for the corresponding recording. The server generates an M×N matrix based on the track vectors generated for the plurality of recordings, decomposes the matrix into a set of basis vectors, and stores one or more of the basis vectors as an identifier for the first collection.

According to one embodiment of the invention, the M track vectors are linearly independent from one another. The linear independence of a particular one of the M track vectors may be achieved, for example, by multiplying a random number to each of the N vector elements of the particular one of the M track vectors.

According to one embodiment of the invention, the decomposing of the matrix includes performing a singular value decomposition of the matrix.

According to one embodiment of the invention, two of the basis vectors is stored as the identifier for the first collection.

According to one embodiment of the invention, the server generates an identifier for a second collection of recordings, compares the identifier for the second collection with the identifier for the first collection, retrieves metadata information stored in association with the first collection based on the comparison of the identifiers, and transmits the metadata information to a player device.

According to one embodiment of the invention, the comparison includes a vector distance computation.

DETAILED DESCRIPTION

In general terms, the present invention is directed to using the TOC information contained in an audio CD to generate a TOC print which may be used for identifying the CD. Once the TOC print has been generated, the TOC print may be compared against the TOC prints of known CDs in a central database to retrieve from the database metadata information stored in association with the known CDs. The metadata information may include, for example, the name of the artist, album, tracks, label, and the like. Any other metadata information may also be stored in the database including, without limitation, album cover, genre information, rating information, trivia information, and the like.

Although the below embodiments are described with reference to audio CDs, a person of skill in the art should recognize that the embodiments of the present invention may apply to any collection of recordings stored in any secondary storage device including DVDs, hard disks, and the like. In addition to audio recordings, the recordings may also include recordings of video or other types of media as long as the temporal position of each recording in the collection (hereinafter referenced as the TOC data) is available for at least a predetermined number of recordings in the collection.

FIG. 1 is a block diagram of a system for generating and using TOC print information according to one embodiment of the invention. The system includes a plurality of end user devices 10 coupled to each other and a server 12 over a wired and/or wireless communications network 14. The data communications network 14 may be any network conventional in the art, such as, for example, a local area network, a wide area network, the Internet, a cellular network, personal area network, or the like. Any wired or wireless technology known in the art may be used for connecting to the data communications network.

Each end device 10 may be a personal computer, personal digital assistant (PDA), entertainment manager (e.g. iPod), car player, home player, portable player, portable phone, or any consumer electronics device known in the art. According to one embodiment, each end device is configured with the necessary software and hardware for reading and playing a CD or any other collection of recordings. Each end device also includes software that retrieves TOC data from the CD and transmits the TOC data to the server 12 over the data communications network 14. The end device further receives metadata from the server 12 and displays the metadata on a display device.

According to one embodiment of the invention, the server 12 includes a TOC module 20 which may be implemented via software, firmware, and/or hardware. If implemented via software, the TOC module 20 is embodied as computer program instructions that are stored in the server's memory and executed by a processor included in the server 12. The TOC module 20 is programmed to receive from a particular end device 10, TOC data retrieved from a particular CD and generate a TOC print, much like a fingerprint, of the TOC data. The TOC module 20 is then configured to compare the generated TOC print against TOC prints of the known CDs in a central database, and retrieve metadata stored in the database based on a match of the TOC prints. In this regard, the server 12 includes a mass storage device 16 for storing the TOC prints of known CDs as well as the metadata information and any other information associated with the TOC prints.

According to one embodiment of the invention, the TOC data retrieved from a particular CD provides a temporal position for each track (also referred to as a recording) in the CD. For example, the TOC may take the following shape:

Track 1: Position 02:03:30
Track 2: Position 07:34:34
Track 3: Position 11:23:45
End of CD: Position 14:45:24.

The temporal length $L_i$ of each track i may then be determined from the temporal position information.

According to one embodiment of the invention, in order to generate the TOC print of TOC data associated with M tracks of a particular CD, a track vector is generated for each track based on its corresponding length $L_i$, where i=1, 2, ... M. The method normally calls for the N dimensions or number of elements in the track vectors, to be equal to the number of tracks, i.e. M=N. This causes the creation of a square matrix. The reason for this is for maximum resolution since, as described below, we want M≧N.

According to one embodiment of the invention, an upper limit is placed on N. An exemplary upper limit is 30. In other words, although the TOC print generation mechanism calls for a square matrix, this requirement may be relaxed to achieve certain desired performance/accuracy tradeoffs.

A minimum number of tracks may also be required in order to generate the TOC print. According to one embodiment of the invention, a minimum of three tracks are required. Thus, according to one embodiment of the invention, 3≦M≦30.

An M×N matrix A is then generated containing M track vectors in N-space. The dimension of matrix A is therefore, N.

Matrix A is used as an input for analysis and data reduction using a Singular Value Decomposition (SVD) operation which is well known in the art. In general terms, SVD is a technique that reduces a M×N matrix A, where M≧N, into a product of three matrices as follows:

$$SVD(A) = USV^T$$

where U is a M×N orthogonal matrix, S is an N×N diagonal matrix with positive or zero valued elements, and $V^T$ is the transpose of an N×N orthogonal matrix. The rows of V transposed are the new basis vectors for A, arranged in decreasing order of significance, as is discussed in further detail in the above-referenced U.S. application Ser. No. 10/668,926. It is this property that makes it possible to perform a data reduction in a controlled manner.

In order for this to be effective, however, one requirement is that the M×N matrix A have a rank R that is equal to or approximates M (i.e., R≈M), the total number of tracks being considered for identification purposes. The rank of a matrix is a well known concept in linear algebra. In order for R≈M, one requirement is that the M track vectors in matrix A be linearly independent. The following formulas are used to produce the M linearly independent vectors of matrix A.

Assume that the length $L_i$ of each track i is the length of a yet-to-be-determined track vector in some N vector space. The Euclidian length of the yet-to-be-determined track vector is computed according to the following standard text-book formula:

$$L_i = \sqrt{\sum_{j=1}^{N} a_{ij}^2}$$

This formula is manipulated to compute each $a_{ij}$ element of the track vector. According to one embodiment of the invention, the independence requirement is met by multiplying a random number into each element of the track vector. In addition, the $a_{ij}$'s are a function of $L_i$. A person of skill in the art should recognize that there are other ways to ensure independence of the M track vectors. The results are the following:

$$a_{ij} = \sqrt{L_i^2 r_j}$$

$$L_i = \sqrt{\sum_{j=1}^{N} \left(\sqrt{L_i^2 r_j}\right)^2}$$

$$L_i = \sqrt{\sum_{j=1}^{N} L_i^2 r_j} = L_i \sqrt{\sum_{j=1}^{N} r_j}$$

According to one embodiment of the invention, the random numbers, $r_j$, are normalized to make this an identity. According to another embodiment of the invention, the random numbers are not normalized.

Thus, matrix A may be generated with the vectors generated for each $L_i$ where each vector element is computed as follows:

$$a_{ij} = \sqrt{L_i^2 rand_k} = L_i \sqrt{rand_k} \approx L_i rand_k$$

where $rand_k$ is either a normalized or un-normalized random number.

According to one embodiment of the invention, the square root operation of the sum of the random numbers may be ignored because it is not needed to achieve the desired outcome, i.e. one set of random numbers performs just as well as others.

Once matrix A is generated, an SVD computation is performed and one or more vectors (rows) of the transposed V matrix is set as the TOC print for the CD. According to one embodiment of the invention, the first two rows of the transposed V matrix are used as the TOC print. In addition to the TOC print, all or portion of the TOC data and/or track lengths may also be stored. The TOC print may then be used for identification or classification of a CD.

Figure 2:
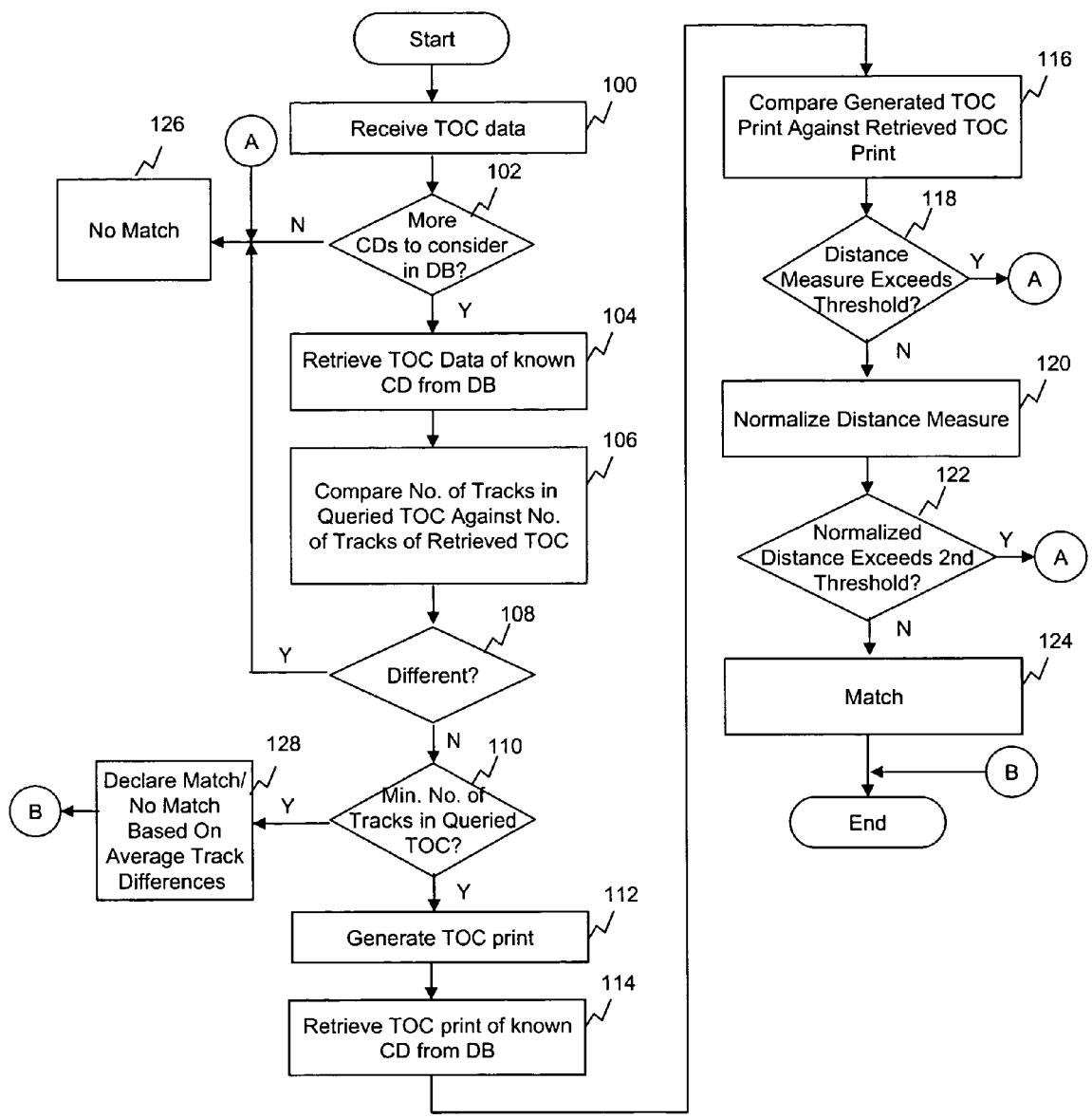
FIG. 2 is a flow diagram of a process for retrieving metadata information from a mass storage device based on a generated TOC print according to one embodiment of the invention.

FIG. 2 is a flow diagram of a process executed by the TOC module 20 for retrieving metadata information from the mass storage device 16 for a CD according to one embodiment of the invention.

In step 100, the TOC module 20 receives a TOC query including the TOC data of a particular CD from one of the end devices 10. In step 102, the TOC module 20 determines whether the mass storage device 16 stores information on CDs that may be compared against for a match.

If the answer is YES, the TOC module retrieves, in step 104, the TOC data of the next known CD from the mass storage device 16.

In step 106, the TOC module 20 compares the number of tracks in the queried TOC against the number of tracks in the retrieved TOC. A determination is then made in step 108 as to whether the number of tracks is different.

If the number of tracks is different, a conclusion is made that there is no match of the CD associated with the queried TOC data with the CD associated with the retrieved TOC data. Accordingly, a no match is declared in step 126.

However, if the number of tracks is the same, the TOC module proceeds to make a comparison of their TOC prints. According to an alternative embodiment, steps 106-108 are eliminated, and the process proceeds directly to step 110. In either embodiment, in step 110, a determination is made as to whether the queried TOC includes a predetermined minimum number of tracks needed for generating a TOC print. According to one embodiment of the invention, the minimum number of tracks is 3.

If the number of tracks is less than the required minimum, an average track length difference is computed and compared against a threshold in step 128. A match or no match is declared based on the comparison. Specifically, the following pseudocode is implemented in comparing a CD A that is being queried with and a CD B in the mass storage device:

1 track CD: if (abs(len1A−len1B)<threshold) return MATCH; else return NOMATCH;
2 track CD: sum=abs(len1A−len1B)+abs(len2A−len2B); if (sum/2<threshold) return MATCH; else return NOMATCH;

If, however, the number of tracks is greater or equal to the required minimum, the TOC module generates a TOC print in step 112 of the queried TOC data.

In step 114, the TOC module 20 retrieves the TOC print of the known CD from the mass storage device. In step 116, the generated TOC print is compared against the retrieved TOC print. In this regard, a vector distance computation is performed as is discussed in the above-referenced U.S. application Ser. No. 10/668,926.

In step 116, a determination is made as to whether the distance measure exceeds a predetermined threshold. If the answer is NO, another measurement is made due to the possibility that the two TOCs to be compared may differ by only a multiplication constant with regards to their temporal length sequences, $L_i$. If one $L_i$ sequence differs from another by only a multiplication constant, the SVD computation is blind to this difference and may indicate a false match. Thus, a secondary distance measure is performed to account for this possibility. In this regard, the distance measure is normalized in step 120 by the number of tracks.

In step 122 a determination is made if the normalized distance measure exceeds a second predetermined threshold. According to one embodiment of the invention, if the number of tracks is greater or equal to a predetermined number (e.g. 9), the normalized distance measure is compared against a constant threshold. However, if the number of tracks is less than the predetermined number, the normalized distance measure is compared against a second threshold which is a function of the number of tracks. Alternatively, the normalized distance measure is always compared against a threshold that is a function of the number of tracks.

If the normalized distance measure is less than the second predetermined threshold, a conclusion is made that there is a match of the CD associated with the queried TOC data with the CD associated with the retrieved TOC data. Accordingly, a match is declared in step 124.

Figure 3:
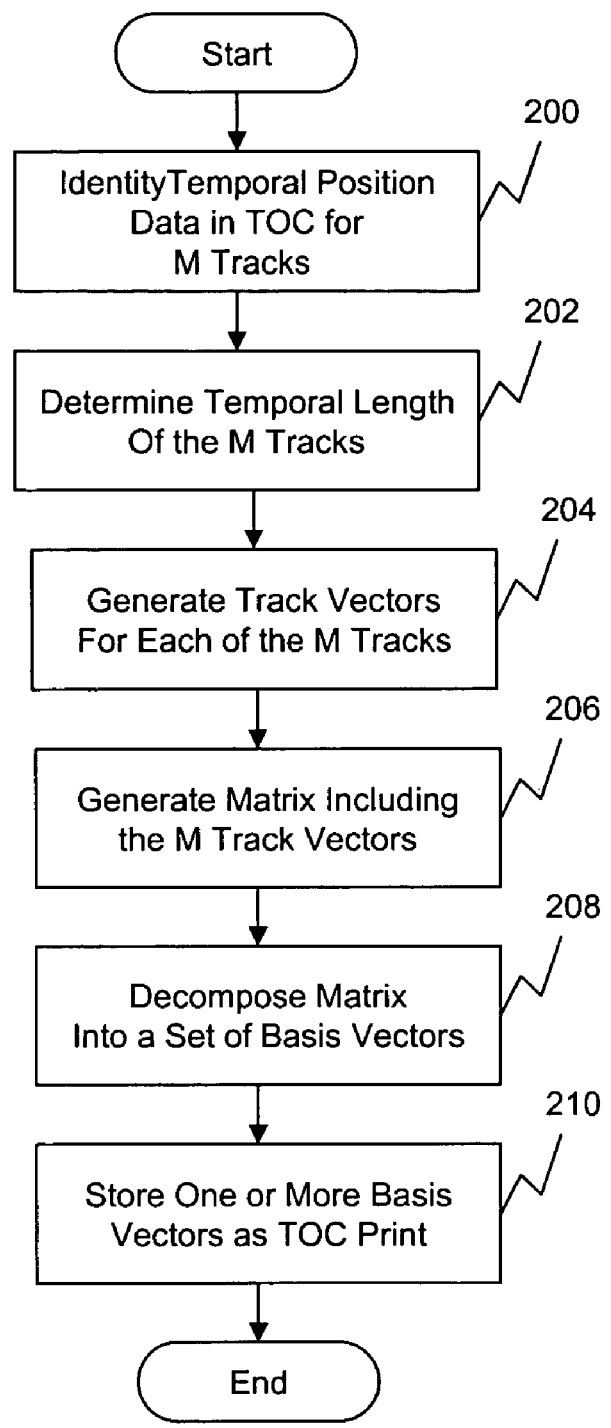
FIG. 3 is a flow diagram of a process for generating a TOC print according to one embodiment of the invention.

FIG. 3 is a flow diagram of a process executed by the TOC module 20 for generating a TOC print for queried TOC data according to one embodiment of the invention. In step 200, the TOC module 20 identifies temporal position data for M tracks contained in the queried TOC.

In step 202, the TOC module 20 determines the temporal length of the M tracks.

In step 204, the TOC module 20 generates track vectors for each of the M tracks.

In step 206, the TOC module 20 generates a matrix that includes the M track vectors.

In step 208, the TOC module 20 decomposes the matrix into a set of basis vectors.

In step 210, the TOC module stores one or more basis vectors as the TOC print.

Although this invention has been described in certain specific embodiments, those skilled in the art will have no difficulty devising variations to the described embodiment which in no way depart from the scope and spirit of the present invention. In addition, to those skilled in the various arts, the invention itself herein will suggest solutions to other tasks and adaptations for other applications. For example, although the above embodiments discuss using the TOC print for identification and/or classification of CDs, a person of skill in the art will recognize other uses of the TOC print. It is the Applicants' intention to cover all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive.

What is claimed is:

1. A computer implemented method for identifying a first collection of recordings, each recording having a temporal position in the first collection, the method comprising:
    retrieving a temporal length for each of M recordings in the first collection, each temporal length being based on the temporal position of the corresponding one of the M recordings, wherein M is a positive integer value;
    generating M track vectors for the M recordings, each of the M track vectors including N vector elements, each of the N vector elements being a function of the temporal length for the corresponding recording, wherein N is a positive integer value;
    generating an M×N matrix based on the track vectors generated for the plurality of recordings;
    decomposing the matrix into a set of basis vectors; and
    storing one or more of the basis vectors as an identifier for the first collection.

2. The method of claim 1, wherein the M track vectors are linearly independent from one another.

3. The method of claim 2, wherein linear independence of a particular one of the M track vectors is achieved by multiplying a random number to each of the N vector elements of the particular one of the M track vectors.

4. The method of claim 1, wherein the decomposing of the matrix includes performing a singular value decomposition of the matrix.

5. The method of claim 1, wherein two of the basis vectors is stored as the identifier for the first collection.

6. The method of claim 1, wherein the first collection of recordings is an audio compact disc, and each recording is an audio track in the audio compact disc.

7. The method of claim 1, wherein M=N.

8. The method of claim 1, wherein M≧3.

9. The method of claim 1, further comprising:
    generating an identifier for a second collection of recordings;
    comparing the identifier for the second collection with the identifier for the first collection;
    retrieving metadata information stored in association with the first collection based on the comparison of the identifiers; and
    transmitting the metadata information to a player device.

10. The method of claim 9, wherein the comparison includes a vector distance computation.

11. A server identifying a first collection of recordings, each recording having a temporal position in the first collection, the server comprising:
    a processor; and
    a memory operably coupled to the processor and having program instructions stored therein, the processor being operable to execute the program instructions, the program instructions including:
        retrieving a temporal length for each of M recordings in the first collection, each temporal length being based on the temporal position of the corresponding one of the M recordings, wherein M is a positive integer value;
        generating M track vectors for the M recordings, each of the M track vectors including N vector elements, each of the N vector elements being a function of the temporal length for the corresponding recording, wherein N is a positive integer value;
        generating an M×N matrix based on the track vectors generated for the plurality of recordings;
        decomposing the matrix into a set of basis vectors; and
        storing one or more of the basis vectors as an identifier for the first collection.

12. The server of claim 11, wherein the M track vectors are linearly independent from one another.

13. The server of claim 12, wherein linear independence of a particular one of the M track vectors is achieved by multiplying a random number to each of the N vector elements of the particular one of the M track vectors.

14. The server of claim 11, wherein the program instructions for decomposing the matrix includes program instructions for performing a singular value decomposition of the matrix.

15. The server of claim 11, wherein two of the basis vectors is stored as the identifier for the first collection.

16. The server of claim 11, wherein the first collection of recordings is an audio compact disc, and each recording is an audio track in the audio compact disc.

17. The server of claim 11, wherein M=N.

18. The server of claim 11, wherein M≧3.

19. The server of claim 11, wherein the program instructions further include:
    generating an identifier for a second collection of recordings;
    comparing the identifier for the second collection with the identifier for the first collection;
    retrieving metadata information stored in association with the first collection based on the comparison of the identifiers; and
    transmitting the metadata information to a player device.

20. The server of claim 19, wherein the program instructions for the comparison includes program instructions for a vector distance computation.

* * * * *